United States Patent [19]

Oberton

[11] 4,040,926
[45] Aug. 9, 1977

[54] ELECTROFILTRATION PROCESS FOR PURIFYING ORGANIC LIQUIDS

[75] Inventor: Serafin Bess Oberton, Missouri City, Tex.

[73] Assignee: Petrolite Corporation, St. Louis, Mo.

[21] Appl. No.: 636,261

[22] Filed: Nov. 28, 1975

[51] Int. Cl.² ............................................. B03C 5/00
[52] U.S. Cl. .................................. 204/186; 204/308
[58] Field of Search .......................... 204/186, 188–191, 204/184, 302, 308

[56] References Cited

U.S. PATENT DOCUMENTS

| | | | |
|---|---|---|---|
| 1,377,021 | 5/1921 | Mumford | 204/186 |
| 2,516,733 | 7/1950 | Unschuld | 204/186 |
| 2,534,907 | 12/1950 | Ham et al. | 204/188 |
| 2,573,967 | 11/1951 | Hamlin | 204/302 |
| 3,394,067 | 7/1968 | Shirley | 204/180 R |
| 3,799,855 | 3/1974 | Franse | 204/188 |
| 3,799,857 | 3/1974 | Franse | 204/188 |

Primary Examiner—T. M. Tufariello
Attorney, Agent, or Firm—Sidney B. Ring; Hyman F. Glass

[57] ABSTRACT

Non-petroleum organic liquids (fats, animal and vegetable oils, etc.) containing solids (e.g., hydrogenation catalysts) are purified within a unique electrofiltration system wherein the organic liquids are passed through a selected bed material in which is established an intense electric field for removing the solids. Upon solids-fillup of the bed, selectively cleaning restores the bed for continued purification of the organic liquid stream. The purified organic liquid stream is monitored for indicating when the selective cleaning of the bed is required. The electrofiltration system, both in a novel electrofilter and process, produces without aging a new organic liquid product having comparable properties to multistep processed prior art organic liquid.

40 Claims, 3 Drawing Figures

ELECTROFILTRATION PROCESS FOR PURIFYING ORGANIC LIQUIDS

BACKGROUND OF THE INVENTION

1. Field of the Invention

This invention related to the removal of solids from an organic liquid by using electrical fields. The invention more particularly relates to the removal from organic liquids of solids by their induced adherence upon a particulate bed under the action of d.c. electrical fields.

2. Description of the Prior Art

Non-petroleum organic liquids include fats, vegetable and animal oils which may be used for human consumption, but are not necessarily limited to such utilization. These organic liquids can be purified by removing solids to improve chemical properties, color and visual appearance, and for other reasons. In one example, the hydrogenation of edible oils for preparing more suitable products for human consumption has been known for nearly 100 years. The modern hydrogenation process for edible oils originated in research work conducted at the turn of this century. In this process, the edible oils, such as cottonseed, soybean, and corn oil, are placed within a reaction vessel (commonly termed a "converter") and brought into contact with hydrogen at elevated temperature and pressure in the presence of a small amount of metal hydrogenation catalyst. For example, the catalyst is usually present in small amounts which may range from 0.01 to about 0.5% by weight based upon the total weight of the edible oils subjected to hydrogenation. Various types of hydrogenation catalysts, such as copper chromite, are known for providing the reaction between hydrogen and the edible oil. For example, one commercial hydrogenation catalyst includes the metal nickel as the principal catalytic agent, but it also may have minor amounts of copper, alumina, or other materials. The metal hydrogenation catalysts are employed principally in a finely defined divided form and are prepared by special methods. Commonly, the nickel metal is placed upon a finely divided, highly porous, inert refractory material, such as diatomaceous earth, or other highly siliceous material. The catalyst is suspended in the edible oils during the hydrogenation process as oil-coated inert solids, which may adsorb soaps or other impurities found in the oil. After the hydrogenation reaction is completed to the desired degree, the hydrogenation reaction materials are removed from the converter. Then, these materials are passed through a filtration system for removing the inorganic solids from the hydrogenated edible oil product.

Various inorganic materials are added to the hydrogenated edible oil product to enhance its filterability. Filteraids usually are employed to promote the product filtration procedure. Various types of relatively sophisticated and expensive filtration equipment are employed. Generally, pressurized filter press assemblies are used, in parallel flow arrangements, to pass the product through a multitude of filter elements which may comprise screen supports carrying paper, canvas or other types of filter medium. These filter elements may be precoated with some type of diatomaceous earth or filteraid to improve oil filterability. The hydrogenated edible oil product is passed through these filters to remove as much as possible of the hydrogenation catalyst material and other inorganic solids materials. However, the filters cannot remove substantially all of the inorganic solids. Additionally, the filters pass decreasing amounts of inorganic solids as the filtration procedure progresses towards an ultimate removal level.

The edible oil industry employs two basic tests to determine the effectiveness of filtration on a hydrogenated edible oil product. In one test, a pound of the edible oil is passed through a filter disc at regulated physical conditions of temperature and time. The filter disc retains impurities above a certain size magnitude leaving a "dark spot" which is compared to a standard set of filter discs. The test is known as the "Filter Disc Impurities Test". The standard discs are numbered 1 through 10, with number 10 being that disc which shows no change in "color" over the unused filter disc. Another test is the analysis of the edible oil for nickel content. The filtration procedure produces an edible oil with from one to several parts per million (ppm) of nickel content. For consumer acceptance and long term storage and other reasons, the nickel content is preferred to be less than 1 ppm of nickel.

Mechanical filtration equipment employed in the edible oil industry usually passes some solids during the filtration procedure. As an example, the edible oil product has a color of relatively low value, e.g., 4, at the beginning of filtration, but then its color test rapidly improves towards a filter disc color of 9 or better. For this reason, the filter equipment cannot produce throughout the edible oil filtered product a filter disc color of 9 or better.

The filtered edible oil, at elevated temperatures, is subjected to additional treating steps which may include treatment with bleaching earth, phosphoric or citric acid or other metal scavengers, with the addition of filteraids, so that the finely divided residual inorganic catalytic and other solids are removed. The edible oil accepted by consumers must have a color of 9 or better. Thus, filtration or other color improvement procedures are employed with each edible oil subjected to the hydrogenation. Substantial time elapses in these procedures and subjects the edible oils to aging. The procedures are practiced until the edible oil has a filter disc color of 9 or better, and residual hydrogenation catalyst solids, and possibly colloidal nickel metal, is at an acceptable low value.

Nearly forty years ago, it was proposed to purify edible oils by adding a small amount of a loader-type solids, such as "10% activated clay" in a finely divided admixture to the edible oil. This mixture was then flowed horizontally in a zigzag path between closely spaced electrodes which were energized to elevated potentials. The impurities and the loader solids were to migrate to one or the other electrodes for their removal from the edible oil. Accumulated solids might "drop off" after reaching a certain thickness on the electrodes or they could be removed by interrupting or reversing the current. Mechanical removal of the solids from the electrodes could also be used. Unfortunately, the unpacked dielectric zone between the electrodes will not remove substantially all of the impurities from the edible oil. One reason for this result may be that the electric field cannot be made of sufficient intensity even with closely spaced electrodes that substantially all of the inorganic solids could be removed from the edible oils. Some solids pass through the spaces between the electrodes without being attracted to them for removal from the edible oil.

It has been proposed for nearly as many years to employ electrofiltration systems for removing inorganic and organic solids from dielectric natural and petroleum oils. For this purpose, the dielectric oil carrying the solids is passed through a particulate material within an elevated d.c. electric potential field. The d.c. field can have potentials of between 5 to 200 kilovolts established across the bed. The bed might be composed of particles of materials such as furnace slag, sand, gravel, limestone, crushed glass, glass bead, ceramics, palletized clay, and like solid materials. Various types of electrode arrangements have been advocated for providing the high voltage d.c. electrical field for these electrofilter devices. The electrofilter devices, which have been known in the past, have been highly effective for removing inorganic solids from dielectric liquids such as the hydrocarbon products of crude oil refining. Unfortunately, these electrofilters are very effective in attracting solids to the particulate bed materials. These removed solids adhere very strongly to the bed material even with the d.c. electric field removed from the electrofilter device. Once the bed is subject to a solids-fillup, substantial changes in electrical conductivity occur which induce arcing in many instances. Arcing can produce a sudden release of solids into the dielectric liquid. Then, the bed must be cleaned before being re-used.

The tenacious adherence of inorganic solids upon the particulate bed of electrofilters has required special techniques for regeneration. Example may be taken to U.S. Pat. Nos. 3,394,067, 3,799,855, 3,799,856 and 3,799,857 for illustrations of various types of practical and commercial bed cleanup systems. These patents described cleanup procedures which produce a very high mechanical agitation between the particles of the electrofilter bed for mechanically removing adhering inorganic solids. Naturally, high levels of mechanical contact between these particles cause abrasion and could result in a small amount of abraded particle material being released from the bed. As a result, the bed would have to be scrupulously cleaned of the small fragmented portions of the particulate material unless these residues were not critical to the dielectric liquid being treated. In the electrofiltration purification of hydrocarbon materials, such as distillates and residual streams or inorganic materials, a small amount of residue from abraded particulate bed material would not be a problem. However, these abraded materials are intolerable in edible oils.

The prior art has included proposals to employ electrofiltration for purification of various types of dielectric organic liquids for about four decades. However, no electrofilter device has produced the purification of organic liquids which contain finely-divided inorganic and organic solids for several important reasons. In the first instance, the electrofilter equipment must effect complete removal from solids without either an unacceptable pressure buildup or deleterious change in electrical characteristics inducing arcing, shorting and like problems. In the second instance, the electrofilter must be capable of handling effectively the organic liquid stream containing widely varying amounts of solids. In the third instance, the electrofilter system must contain a particulate bed material of special characteristics so that (1) the organic liquid product is produced with extremely low amount of residual solids, without undue pressure buildup or arcing, (2) the particulate bed material is readily cleaned of adhering solids, and (3) no abrasion or loss of the particulate bed material itself occurs to contaminate the organic liquid. The foregoing reasons summarize the incapability of prior art electrofiltration system in being used in the purification of organic liquids containing finely divided solids.

The present invention is an electrofiltration system for purifying organic liquids by removal of finely-divided solids without the foregoing recited problems of prior art electrofilters. In particular, the present invention is a novel electrofilter, electrofiltration process, and organic liquid product. A selected material in the bed of the electrofilter system produces a substantially complete removal of the solids, irrespective of the solids loading content, and without the electrofilter system having any appreciable pressure buildup or electrical arcing in the bed. The bed is chemically inert, and no contamination of the organic liquid stream occurs in use. The cleaning of the bed of accumulated solids is not complicated and produces an environment for continuous and repeated electrofiltration for producing a product organic liquid equal in physical and chemical characteristics to commercial product prepared by extended time, multistep procedures. Additional features of the present invention will be appreciated from the following description.

SUMMARY OF THE INVENTION

In accordance with this invention, there is provided an electrofiltration system, including apparatus, process, and product, for the purification of an organic liquid stream of high resistivity. In particular, the organic liquid stream, at suitable temperature, is passed through a chemically inert bed having multitudinous flow channels between rigid masses of a solid material having a dielectric constant not in excess of about 7. A d.c. electric field within the bed provides a sufficient intensity for removing solids from the organic liquid stream by the electrically induced adhesion of the solids on the material to provide a purified organic liquid stream removed to a subsequent utilization. The bed material, at least in part, is selectively cleaned of adhering solids by interruption of the electrical field, passing a cleaning fluid through the material to remove adhering solids, and then removing the fluid with the removed solids from the material being cleaned. In a preferred embodiment, the purified organic liquid stream is monitored to provide an indicating signal when to undertake the selective cleaning of the bed material. The purified organic liquid stream is a novel product, quickly prepared without aging, and having comparable chemical and physical properties to conventional multistep treated commercial product.

DESCRIPTION OF SPECIFIC EMBODIMENTS

Figure 1:
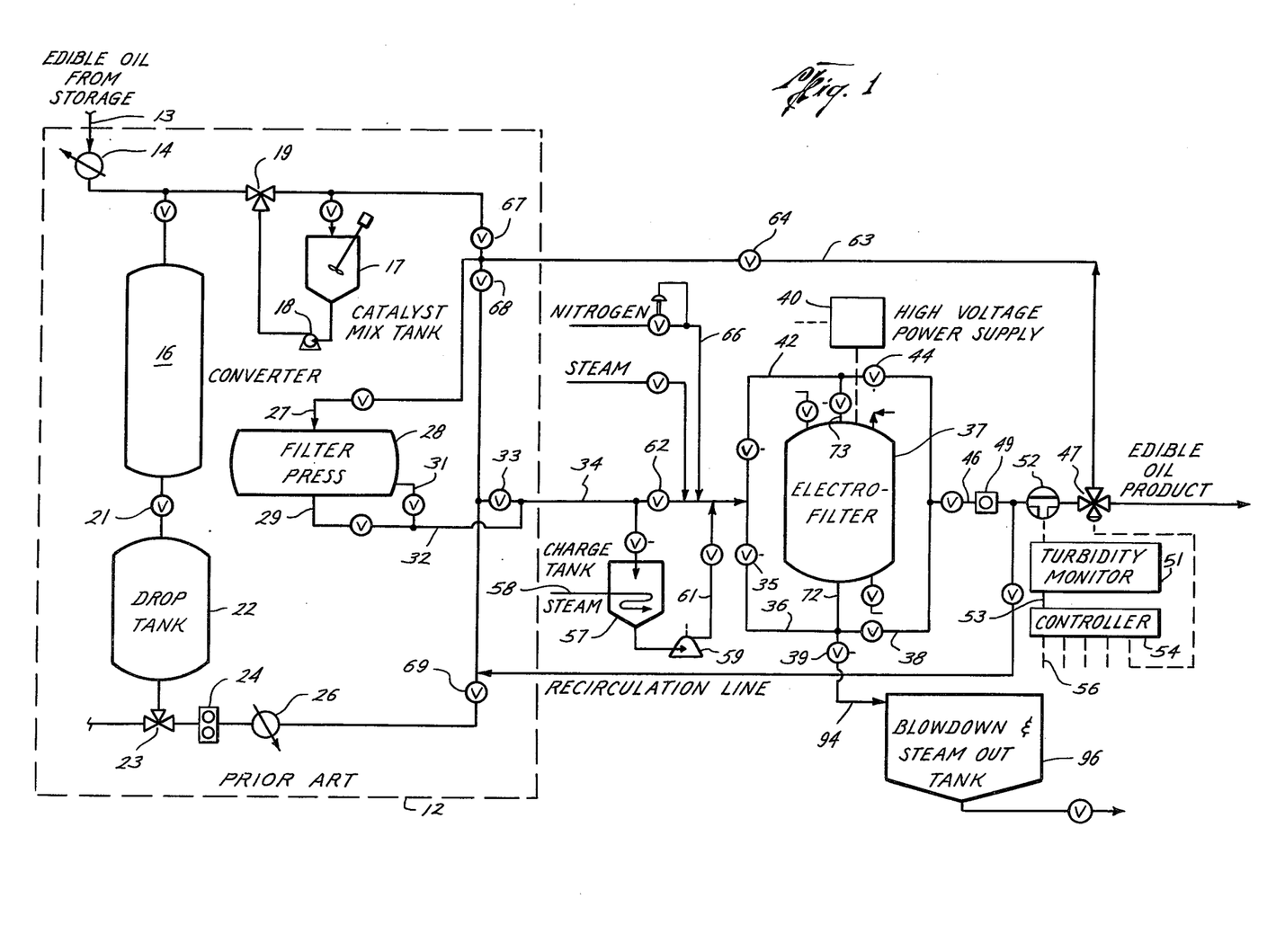
FIG. 1 is a diagrammatical illustration, in flow schematic, of the present electrofilter system applied to a prior art hydrogenation plant for producing edible oil as an example of an organic liquid.

The present electrofilter system will be described in the purification of one type of organic liquid, namely, an edible oil. However, it will be appreciated that the invention is equally applicable and of utility with other types of organic liquids, e.g., fats, animal and vegetable oils. Referring now to FIG. 1, there is shown an embodiment of the present electrofilter system associated with an appropriate portion of a prior art hydrogenation plant, wherein edible oils are contacted with hydrogen at elevated temperature and pressure in the presence of a finely-divided catalytic material. More particularly, the hydrogenation plant 11 is enclosed within the chainline 12 with the designation of prior art being applied as an example of commercial operations. An edible oil, such as soybean oil, is brought from storage through an inlet conduit 13 and a heat exchanger 14 directly into the hydrogenation converter 16. The heat exchanger 14 raises the temperature of the edible oil to a suitable level, e.g., above 250° F. The converter 16 is a steel vessel usually with an upright axis which contains the charge of edible oil to be hydrogenated. The edible oil in the converter is admixed with a suitable amount of metal catalyst. In most instances, a diatomaceous earth or a filteraid material is intermixed with the catalyst in suitable proportions with an edible oil carrier in the catalyst mix tank 17. Then, this mixture is displaced by pump 18 through a control valve 19 into the converter 16. The converter 16 usually has an internal mixer arrangement for maintaining a suspension of the catalyst materials within the edible oil. Hydrogen is added to the converter 16. The hydrogenation reaction takes place over a suitable length of time, such as one hour, depending upon the mass of edible oil charge and the desired hydrogenation degree to be produced in the edible oil product.

The converter 16 may be any suitable size. For description, the converter 16 will receive an edible oil charge of about 40,000 pounds, and the hydrogenation catalyst material is of the nickel metal variety, which is introduced to a suitable concentration of between 0.01 and 0.5 percent by weight. The nickel catalyst is approximately 25% by weight of nickel with the remainder being Kieselguhr or other diatomaceous earth material.

After the hydrogenation reaction is completed, the contents of the converter 16 are moved through the valve 21 into a drop tank 22 where the hydrogenated edible oil product is held while being processed for the removal of the finely-divided hydrogenation catalyst and other inorganic solids. Presently, the contents of the drop tank 22 are moved through a control valve 23 by centrifugal pump 24, an optional heat exchanger 26, and through a piping loop containing several control valves to the inlet 27 of the filter press 28. The filter press is conventional with a plurality of filter elements. The filtered edible oil is removed from the filter press 28 through the outlets 28 or 31 depending upon whether the sections are operated in parallel or in separate sections. The outlets 29 and 31 connect to a filtered edible oil line 32 for directing this stream to subsequent processing for the removal of residual amounts of the hydrogenation catalyst and other inorganic solids.

For example, the filtered edible oil in the line 32 may contain about several parts per million of nickel metal (suspended and colloidal) so as to have a pronounced green-to-black color, and several parts per million of inorganic solids, such as filteraid, and a filter disc color of 6 or worse. Thus, the filter press 28 cannot produce an acceptable edible oil product that could be used for human consumption. The filtered edible oil in line 32 now usually is subjected to additional processing steps. One step is treatment with citric acid or phosphoric acid and a filteraid material, and filtration to remove the chelated hydrogenation catalyst. Another step is a bleaching operation wherein a small amount of bleaching clay is added to the edible oil, and then filtered to provide the edible oil product. The edible oil product after one or more of these steps is an edible oil product directly suitable for consumer use. Sometimes, this product is subjected also to a winterizing and/or deodorizing step to produce certain types of edible oils.

In the present invention, all mechanical filtration steps are avoided. The hydrogenated edible oil in the drop tank 22 is passed through the novel electrofilter system of the present invention. Referring specifically to that portion of FIG. 1 outside the chainline 12, the edible oil from the drop tank 22 is diverted through the block valve 33 into a raw oil line 34. The edible oil in the line 34, by use of the heat exchanger 26, is adjusted in temperature, usually above 150° F., so that organic solids, such as stearine, are in total solution in the edible oil stream and cannot plug the electrofilter. The line 34 connects into an inlet manifold 36 associated with the electrofilter 37. The manifold 36 has a plurality of motor control valves 35, 38, and 39, whose functions will be hereinafter described. With this arrangement of the inlet manifold 36, the edible oil is passed upwardly through the electrofilter 37 and removed through the outlet manifold 42 which includes motor control valves 43 and 44. However, it may be desired to have the edible oil passed downwardly through the electrofilter 37 and the functions of the inlet and outlet manifolds would then be reversed. The piping for the present system is arranged for this purpose as will be appreciated by examination of the respective manifolds and their connections into the system shown in FIG. 1.

The electrofilter 37 is arranged so that substantially all of the undissolved solids, including the hydrogenation catalyst, filteraid, diatomaceous earth, etc., and any insoluble organic solids, are removed from the edible oil stream. The electrofilter 37 has a selected bed forming an inner electrode space subjected to a high intensity d.c. electric field for removing substantially all of these solids from the edible oil. The purified edible oil stream is removed through a product line 46 and a three-way control valve 47 into an edible oil product conduit 48 for removal to a subsequent utilization. Preferably, the edible oil product line 46 includes a monitor of the purified edible oil product from the electrofilter 37 to determine the approach of a suddenly increased solids content which occurs on the approach of solids-fillup in the bed of the electrofilter 37.

The present invention involves the selection of a certain type of material forming the bed of the electrofilter 37. The bed is chemically inert and has multitudinous flow channels between rigid masses of a solid material. The bed material should have a dielectric constant not in excess of about 7. The bed material should have sufficient rigidity so that in operation it cannot be compressed in a degree to reduce the flow channels, thereby producing an unacceptable pressure drop across the bed.

One of the characteristics of the electrofilter 37 with this selected bed is that substantially all of the solids, including even colloidal nickel and filtered materials, are removed from all the edible oil passing into the product line 46, and this purity is maintained until the bed has accumulated its capacity of removed solids as the solids-fillup condition is approached. As this solids-fillup condition is approached in the bed of the electrofilter 37, no significant changes occur in the electrical parameters or measurable physical operation conditions concerning the electrofilter. However, there is a sudden increase in the solids content of the treated edible oil. More particularly, the pressure drop across the electrofilter 37 is small and does not change within the measurement error of conventional pressure guages. In addition, no significant change in electrical parameters, voltage or current, occurs in high voltage electric field imposed upon the bed within the electrofilter 37. These phenomena of the electrofilter 37 are more apparent from the following discussion of the preferred design and operation of the electrofilter 37.

The edible oil treated in the electrofilter 37 enters the product line 46 in such a completely purified form, relatively free of inorganic solids, colloidal metals, etc., that it has a unique appearance classified by experienced workers in the food industry as "bright and clear" in appearance. Edible oil of this bright and clear appearance has a filter disc impurity number generally of about 10. The reason for this unexpected product result is not completely understood except that the electrofilter 37 produces substantially complete removal of nickel catalyst, coloidal nickel, and other solids from the edible oil. In addition, the electrofilter 37 maintains the production of outstanding edible oil product until the solids-fillup condition of the bed of the electrofilter 37 is reached. Only at this solids-fillup condition does the edible oil entering the outlet manifold 42 rapidly deteriorate towards the properties of the raw edible oil flow in the line 34 from the drop tank 22.

As a result, the electrofilter 37 for maximum efficiency and best operation requires a mechanism to predict the onset of this rapid deterioration in edible oil quality when solids-fillup of the electrofilter bed is reached. One means of accomplishing this result is by a fixed time cleaning cycle. Alternatively, the initial appearance of a small amount of inorganic solids in the edible oil within the product line 46 can be detected as solids-fillup condition is approached. When the electrofilter 37 is operating satisfactorily, the edible oil in product line 46 is bright and clear in appearance and also shows no Tyndall effect. At the very onset of solids-fillup in the bed of the electrofilter 37, a slight Tyndall effect occurs in the edible oil. If desired, a sight glass 49 is placed in the product line 46 to detect this Tyndall effect. A narrow beam, high intensity light, through the sight glass 49 displays the occurrence of the Tyndall effect. At this time, the electrofilter 37 is "shut down" for a selective cleaning of the bed by the thorough removal of adhering inorganic solids.

If desired, the monitoring of the edible oil stream for the occurrence of increased solids content can be undertaken by a monitor 51, including an optical cell 52 in the product line 46, to provide an output signal 53. The monitor 51 may be a nephalometer. The output signal can give a visual or arcual indication to an operator. Preferably, the output signal is adapted to adjust the various valves and other switching functions for cleaning the electrofilter 37. The controller 54 upon receipt of the output signal can provide a plurality of output signals 56 to operate the various control valves associated with the electrofilter 37, conduct the stepwise sequence of cleaning steps in the electrofilter 37, and control the operation of a high voltage power supply 40 which is associated with the electrofilter 37. The controller 54 may be convenient and employ either pneumatic or electrical control signals 56 in the necessary sequencing functions for the desired control of the various elements associated with the electrofilter 37. The d.c. electrical field in the electrofilter 37 is removed from the bed material for the cleaning process.

The bed material in the electrofilter 37 is cleaned at least in part, but preferably in its entirety by use of a cleaning fluid. Also, the bed material may be cleaned in place, externally or in any manner wherein the cleaning fluid flow removes solids from the material. If desired, the cleaning fluid may be a portion of the raw edible oil in line 34 taken from the drop tank 22. In other instances, it may be desired to use other fluids for cleaning the bed material of the electrofilter, such as edible oil product taken from the conduit 48. The cleaning fluid can be used in a single pass mode but preferably is recirculated in the cleaning process. In one example, edible oil as a cleaning fluid is placed into the charge tank 57 wherein its temperature can be elevated as desired by use of a steam heating system 58. Then, the pump 59 moves the edible oil through the cleaning line 61, and with the block valve 62 in a closed position, the edible oil flows into the inlet manifold 36 to pass upwardly through the electrofilter 37 into the outlet manifold 42. The circulating edible oil returns in the line 46 through the three-way valve 47, the return conduit 63 through block valve 64 and then into the charge tank 57. However, the electrofilter may be also cleaned with downflowing edible oil. The circulating flow through the cleaning line 61 of edible oil is adjusted in rate so that the bed of the electrofilter 37 is only slightly expanded but not displaced or mechanically abraided in the absence of the d.c. electric field. The edible oil in the charge tank 57 containing the removed solids can be passed through the filter press 28 for recovery of the edible oil which may then be recycled through line 34 and the electrofilter 37. Alternatively, this mixture of edible oil and solids including catalyst may be recycled into the converter 16 for reuse.

Preferably, the cleaning process is carried out in the electrofilter 37 by first terminating flow through the line 34 of the edible oil from the drop tank 22. Then, the valved manifolds are arranged so that a flow of nitrogen from the line 66 is passed downwardly through the electrofilter 37 to displace the residual liquid volume of purified edible oil into the product line 46 and through the valve 47 into the edible oil conduit 48. In this manner, the amount of "slippage" or recycle of purified edible oil is minimized in the use of the electrofilter 37. As long as the power supply 40 is energized and an electric field exists in the bed material of the electrofilter 37, the adhering solids will not be displaced from the bed by the flow of nitrogen. Then, the flow of nitrogen through line 66 is terminated and the power supply 40 is de-energized. The cleaning fluid can now be circulated through the electrofilter 37 as previously described.

The volume of the circulating cleaning fluid is not as critical as the flow rate through the bed of the electrofilter 37 which will usually be in the range of at least 16 inches per minute superficial velocity through the bed material. Under those conditions, the volume of recirculating cleaning fluid may be as small as three times the liquid volumetric capacity of the electrofilter 37. The optical properties of the cleaning fluid and entrained solids flowing through the line 46 can be employed to determine when ultimate cleaning of the bed material has occurred since solids amounts become constant. For example, the monitor 51 reaches a peak reading of opacity which indicates the end of the cleaning cycle. At this time, the cleaning fluid is removed from the electrofilter 37 by switching the necessary valves to be displaced by the incoming edible oil in line 34. Preferably, the cleaning fluid is displaced from the electrofilter 37 by a small quantity of the edible oil product from the product line 46. Alternatively, nitrogen is applied through line 66 (as previously described) to displace the liquid contents of the electrofilter 37 downwardly through the manifold 36 and into the various lines and conduits for its recovery. Now, the bed material of the electrofilter 37 is clean and can be returned to purification of the raw edible oil in line 34. The power supply 40 is energized, the valves adjusted to reinstate the operation of electrofilter 37, and the flow of the edible oil through the conduit 34 from the drop tank 22 is resumed. Thus, the electrofilter 37 employs a selected bed material which not only produces optimum cleaning of the edible oil, but also permits ready cleaning of adhering solids.

Figure 2:
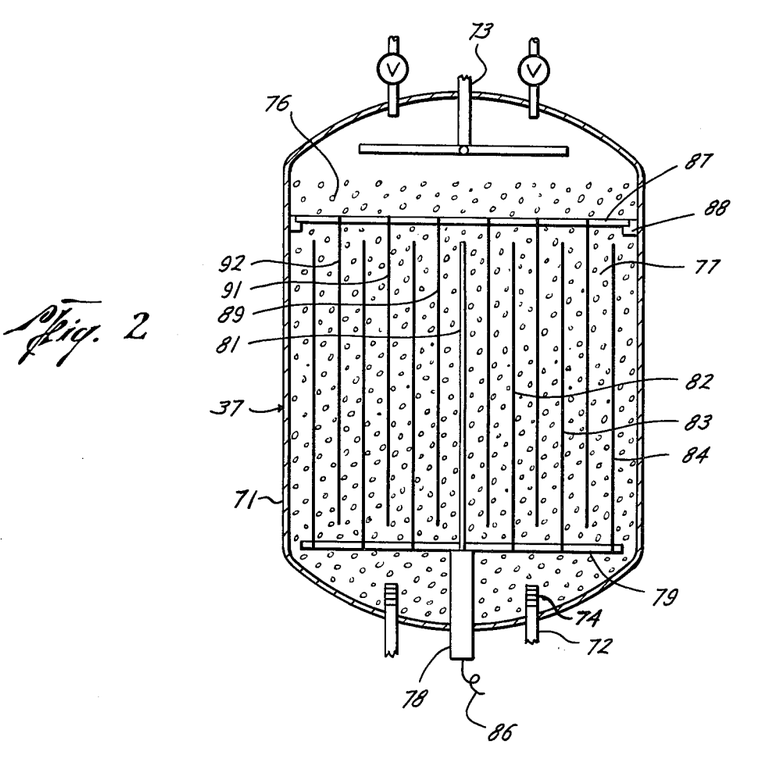
FIG. 2 is a vertical cross-section illustrating the construction of the electrofilter shown in the system of FIG. 1.

The electrofilter 37 has a suitable construction which in one embodiment is illustrated in vertical section in FIG. 2. The electrofilter 37 comprises an upright vessel 71 having inlet connections 72 connected to the inlet manifold 36 and an outlet distributor 73 connected to the outlet manifold 42. Preferably, the inlet 72 is provided by a plurality of well screens 74 which are dimensioned so as to prevent the passage of the material 76 comprising the bed 77. Energized electrodes are positioned within the bed 77 and may take any usual form. For example, an inlet bushing 78 extends upwardly into the vessel 71 and carries a spider 79 on which are mounted in a concentric arrangement an energized rod 81, and metal cylinders 82, 83 and 84. The rod 81 is connected by a lead 86 to the power supply 40 so that the electrodes carried on spider 79 are energized to a d.c. potential relative to the grounded shell of the vessel 71. A similar system of grounded concentric electrodes is suspended from a spider 87 supported upon a mounting bracket 88 carried about the internal perimetry of the vessel 71. Suspended from the spider 87 in concentric relationship are a plurality of cylindrical electrodes 89, 91, and 92. It will be apparent that the concentric relationship of the energized and grounded cylindrical electrodes provide for establishing an electrical field within the bed 77. For example, the spacing between the energized and grounded electrodes can be 1 inch with a like spacing about the rod electrode 81 and to the internal cylindrical surface of the metal shell of the vessel 71. With this arrangement, the power supply 40 should provide at least 20 kilovolts per inch d.c. electrical potential at lead 86. Preferably, the power supply 40 provides a d.c. potential of at least 40 kilovolts per inch within the bed 77. Excessive high intensity potentials in the d.c. electric field within the bed 77 should be avoided. Excessively high d.c. potentials could lead to gas (hydrogen) ionization and arcing within the electrofilter 37. The finely-divided solids carried in the edible oil into the bed 77 are acted upon by the d.c. electric field which electrically induces the adhesion of these solids onto the surfaces of particles 76. For practical purposes, no solids can escape the bed 77 in the presence of the d.c. electric field until the solids-fillup condition is reached. The electrically induced adhesion of solids is so great a force that a flow of nitrogen gas equal in rate to cleaning fluid flows cannot remove them. However, removal of the d.c. electric field allows a simple washing of the bed to remove completely these solids. The electrofilter 37 is a system similar to known electrofilters having particulate materials in their inner electrode spaces. However, the particular selection of the particles 76 forming the bed 77 of the present electrofilter 37 produces an electrofilter system unique in apparatus and process, and this system produces unexpected purification of organic liquids, such as oil streams, into a bright and clear product equal to commercial products obtained by multistep filtration procedures.

More particularly, the bed 77 of the electrofilter 37 is preferably comprised of chemically inert, hard granular particles of a rigid, and substantially incompressible material. Furthermore, these particles are in the majority non-spheroidal with a relatively discontinuous surface configuration and a dielectric constant not in excess of about 7 (at 1 kilohertz). The term "non-spheroidal" is intended to include by definition particles other than true spheres, such as oval and other non-round shapes having minor to major axes in ratios exceeding 4 to 6. By the terminology "relatively discontinuous surface configuration" is meant a surface that is not planar or unbroken such as the surface of a glass bead, and particularly included are multifaceted particles having meeting edges between multitudes of small surfaces which may be planar, concave, convex and combinations thereof, regular or irregular in arrangement.

The exact reason for the novel functioning of the bed 77 in the electrofilter 37 cannot be determined with an exact scientific definition. However, it is believed that the particularly selected particles 76 in conjunction with the electrical characteristics of the organic liquids (e.g., edible oil) and the contaminating solids, such as the metal hydrogenation catalyst and filteraid, interrelate to produce the novel results of the present invention. For example, edible oils have a dielectric constant of about 3.5. The diatomaceous earth carrier (Kieselguhr), the metal hydrogenation catalyst, and filteraid all have a dielectric constant of about 4. The metal hydrogenation catalyst and the filteraid materials have highly developed pore surfaces which appear to be completely saturated with edible oil. The particles 76 which are selected for the purpose of the present invention also have a dielectric constant not greatly in excess of about 7, and preferably below about 5. Thus, all of the dielectric materials within the electrofilter 37 have very similar dielectric constants, and all these materials have extremely high resistivity (e.g., $1 \times 10^{15}$ ohm-cm) and dielectric strength (e.g., above 10 kv, dc/mm). It is believed that these dielectric properties permit the bed 77 to function exceptionally within the high intensity d.c. electric field for electrically inducing the tenacious adhesion of the solids, such as filteraid, to the particles 76. However, terminating the d.c. electric field within the bed 77 allows the adhering solids to be easily removed by a relatively low rate of flow of a cleaning fluid without disruption of the particles 76. For example, the electrofilter 37 will operate to remove solids with a flow of 12 inches per minute superficial velocity of edible oil through the bed 77. However, the particles 76 in the bed 77 are cleaned thoroughly (with the d.c. electric field removed) at the flow rate of above about 16 inches per minute superficial velocity with edible oil as the cleaning fluid. The bed 77 does not need to be made turbulent or suffer particle movement, but preferably, it merely expands slightly during the flow of cleaning fluid.

The particles 76 should be chemically inert and not contaminate the edible oil. The particles 76 should have a relatively discontinuous surface configuration in contrast to a highly polished smooth surface such as glass bead or marble. In addition, the particles 76 should have a relatively high density or specific gravity and a substantial hardness compared to the solids which are to be removed. Particles selected for use in the present electrofiltration system are preferably minerals containing crystalline silicon dioxide such as flint, garnet, granite and fused quartz. These particles 76 selected from this mineral group have a hardness value of at least 7 on the Mohs scale of hardness, a specific gravity between about 2.5 and about 2.9, a dielectric constant of about 4, and a discontinuous surface configuration provided in nature. The particles 76 may range in size from about 1 to about 13 mm for good results. A crushed flint with an average (50 percentile) particle size (smallest dimension) of 2.5 mm gives excellent results. These particles in the electrofilter 37 will not contaminate the edible oil during either electrofiltration or the cleaning cycle for removing adhering solids from the bed 77. In addition, these particles provide an unexpected ease in cleaning the adhering solids from the bed 77 with a cleaning fluid.

An experimental electrofilter system was placed into a commercial edible oil refinery and tested with several edible oils and bed materials to document the outstanding results. The experimental system was essentially similar to that illustrated in FIG. 1 using the electrofilter 37 shown in FIG. 2. The electrofilter was a cylindrical metal vessel having a 15 inch internal diameter with a 30 inch total vertical height. The vessel was placed on an upright axis and arranged with electrodes as is shown in FIG. 2. The concentric electrodes had an engagement length (taken in the vertical) of 14 inches. The interior of the vessel was substantially filled with selected particles according to the guidelines of the present invention. A one inch spacing of the electrodes existed over their engagement length. The electrodes electrically confined in the bed 1.4 cubic feet of these particles. The power supply energized selectively these electrodes to between 20 and 40 kilovolts. An edible oil stream of soybean oil was taken directly from the drop tank of the commercial operation. The drop tank held the hydrogenation edible oil which contained nickel metal in the amount of several hundred parts per million and solids of several hundred parts per million. The experimental electrofilter system was operated on this edible oil charge under precise test procedures on three types of particle media, designated as F-11, M-1, and G-1. These media were commercial Flintabrise brand sandblasting materials which are commercially available from Clemtex Limited of Canada at Houston, Tx. More particularly, the media F-11 was a crushed flint rock with an average (50 percentile) particle size (least dimension) of 2.5 millimeters. The media M-1 was a commercial "No 1 marine sand" which had been screened so that all particle sizes were between 8 and 20 mesh on Tyler standard screens. The media G-1 was a river gravel (granite) which had been screened to sizes between one-fourth and one-half inch. These media are all minerals containing crystalline silicon dioxide, have specific gravities between about 2.5 and about 2.9, dielectric constants less than about 5 and usually about 4, and high dielectric strengths. All media were scrupulously cleaned by carefully screening, water-washing, and air-drying so that no possible contamination of the edible oil stream could occur. Each media was placed within the experimental electrofilter and subjected to test conditions of the same nature as described for the electrofilter 37. The incoming raw edible oil stream was taken directly from the drop tank 22 and passed upwardly through the electrofilter at a rate of about 9 gallons per minute and at temperatures between 150° and 200° F. The product edible oil stream from the electrofilter was tested in accordance with the filter disc impurities test, analyzed for nickel content, and visual appearance. The total throughput volume of the electrofilter was recorded until the onset of product edible oil degradation by increased solids content arising from the onset of solids-fillup of the bed of the electrofilter as detected by the initial observance of a Tyndall effect. The data from these tests of the media are set forth in the following Tables 1, 2 and 3.

TABLE 1

| Media F-11 | Filter Disc | Ni/ppm | Vol/gal | Appearance |
|---|---|---|---|---|
| 40 kv at 0.13–0.30 amps | 8+ | — | 178 | Clear |
| Rate 7.5–9 gpm edible oil | 10 | 1.0 | 326 | Very Clear |
| at 165° F. | 10 | .7 | 823 | Clear |
| Bed loading 6.4 lbs./ft.$^3$ | 10 | — | 1010 | Clear |
|  | 10 | — | 1295 | Clear |
|  | 10 | 3.4 | 1416 | Clear |
|  | 9 | — | 1656 | Clear |
|  | 4 | — | 1895 | Gray Tint |

TABLE 2

| Media M-1 | Filter Disc | Ni/ppm | Vol/gal | Appearance |
|---|---|---|---|---|
| 40 kv at 0.2–0.22 amps | 8 | — | 98 | Clear |
| Rate 6 – 7 gpm edible oil | 7 | — | 168 | Clear |
| at 185 – 192° F. | 10 | — | — | Very Clear |
| Bed loading 3.8 lbs./ft.$^3$ | 10 | — | 359 | Very Clear |
|  | — | — | 408 | Very Clear |
|  | 10 | — | — | Very Clear |
|  | 10 | — | 654 | Very Clear |
|  | — | — | 925 | Dark Gray |

TABLE 3

| Media G-1 | Filter Disc | Ni/ppm | Vol/gal | Appearance |
|---|---|---|---|---|
| 30 kv at 6.0 – 3.0 amps. | 10 | 0.2 | 170 | Clear* |

TABLE 3-continued

| Media G-1 | Filter Disc | Ni/ppm | Vol/gal | Appearance |
|---|---|---|---|---|
| Rate 8 – 9 gpm Edible oil | 10 | 1.1 | 441 | Clear |
| at 202 – 194° F. | 9+ | — | 580 | Clear |
| Bed Loading 7.3 lbs./ft.$^3$ | 9 | — | 855 | Clear |
| | 9 | — | 993 | Clear |
| | — | — | 1131 | Clear |
| | — | — | 1166 | Clear |
| | 8+ | — | 1276 | Clear |
| | 8+ | 0.9 | 1399 | Clear |
| | 6 | — | 1523 | Hazy |

*Slight Tyndall effect

Inspection of the three Tables illustrate the unique operation of the electrofilter system of the present invention in producing a product edible oil which consistently contains no inorganic solids and also has a nickel content of about one part per million. Additionally, the edible oil product was characterized by employees of the food industry as bright and clear. No Tyndall effect was observed in "clear" appearance in the edible oil product. Unexpectedly, the product edible oil had a clear appearance until the filter disc color went from 10 to 8 when the Tyndall effect indicated the approach of a solids-fillup condition in the bed of the electrofilter. Some slight Tyndall effect was indicated initially with the media G-1, but this was believed to have occurred as a result of the start-up operation on the excessively large sizes of the media employed in the bed of the electrofilter.

Figure 3:
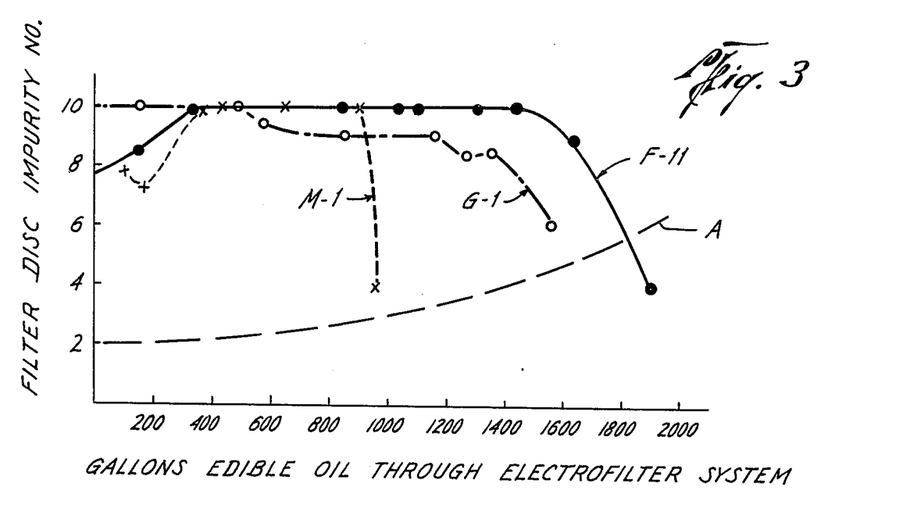
FIG. 3 is a graphic comparison of several bed materials employed in the electrofilter of FIG. 1 and a typical mechanical filtration relative to the filter disc impurities color of an edible oil purified in the present electrofiltration system.

The data from the above Tables is represented graphically in FIG. 3, wherein the throughput capacity of the experimental electrofilter is displayed as one axis while the other axis displays the filter disc impurities number of the edible oil product. It is noted that the media F-11 gave outstanding results, and it is preferred for the purposes of the present invention. The other media, G-1 and M-1, also gave acceptable results. However, the media M-1 did not have the capacity to remove inorganic solids as do media F-11 or G-1. All three media do indicate that the edible oil product maintains outstanding purity until the onset of solids-fillup of the bed in the electrofilter. Then, the deterioration by increased inorganic solids content in the edible oil is very sudden and pronounced. The curve denoted "A" is one example of the filtered edible oil produced by a commercial filter press operation in an edible oil plant wherein the filter disc impurity varies from about 2 to about 6. The initial nonlinear portion of the media F-11 and M-1 curves (until about 400 gallons throughput was reached) is believed to reside in bringing a relatively small volume pilot plant unit onto equilibrium conditions at 9 gallons per minute connected to a drop tank having several ten thousands pounds of hydrogenated edible oil. Slight fluctuations in temperature and pressure occurred during the startup which may also explain these abnormalities.

An acceptable edible oil product in the commercial operations, after bleaching or acid treating, and several filtrations, has a filter disc impurity color of 9. In comparison, the electrofilter of the present invention produces the maximum quality of edible oil product in one quick step which may take less than two minutes in commercial operations.

The edible oil product from the electrofilter system of the present invention at any time before the onset of solids-fillup of the bed has a filter disc color of 10 on an average basis, a nickel content of about 1 ppm, and a visual appearance of bright and clear. This edible oil product from the electrofilter, without any subsequent treatment, is equal in chemical and physical properties to the commercial product obtained by several filtration steps taking several hours within the present day commercial food industry plant. In addition the edible oil product from electrofiltration is substantially free from all suspended and colloidal inorganic solids. For example, the nickel content of the edible oil taken from the drop tank 22 is in the range of several hundred parts per million. It is believed that the colloidal nickel content of this oil is substantially in the tens of parts per million. However, the edible oil product provided by the experimental electrofilter always averaged in the range of about one part per million or less of nickel content. Thus, edible oil product produced by the system of this invention is equal in appearance, and physical and chemical properties to that edible oil product of the commercial plant.

Returning to FIG. 1, the electrofilter 37 upon initial installation should be scrupulously cleaned so that the particulate bed does not contain any type of deleterious material which can enter the edible oil. For this purpose, the electrofilter 37 can be flushed with a heated volume of commercial edible oil from the charge tank 57, cleaning line 61 and through the valved manifolds. In addition, steam can be applied through the line 66 to displace congealed edible oil from the electrofilter 37 or removing any other types of organic materials from the bed, or raise the temperature of the bed to such a degree that a stream of nitrogen will bring it in a substantially dry condition. The edible oil, stream and drain-down liquid from the electrofilter 37 in this cleaning step may be passed to a blowdown tank 96 through the drain line 94 for suitable disposal.

In addition, the described arrangement for cleaning the electrofilter 37 is important in the case of an inadvertent displacement into the drop tank 22 of improperly hydrogenated material, soap, or fatty material of such undesired characteristics that it would contaminate the electrofilter bed 77. In this instance, the use of the system as an initial cleanup can be employed to remove such deleterious or undesired soaps, acids and the like from the bed of the electrofilter 37.

Although the specific organic liquid has been described as an edible oil, the present invention is not limited to such non-petroleum oil and is equally applicable to other types, such as fats, animal and vegetable oils, and related organic liquids.

From the foregoing, it will be apparent that there has been provided an electrofiltration system of apparatus and process well adapted for removing inorganic solids from organic liquid streams. In particular, the system can be operated for extended periods of time with a relatively simple cleaning procedure. No contamination of the organic liquid product can occur from the electrofilter system during operation or cleanup. In addition, the organic liquid product prepared quickly in one electrofiltration step is equal to commercial products conventionally obtained by multistep filtration. It will be understood that certain features and alterations of the present system may be employed without departing from the spirit of this invention. This is contemplated by, and is within, the scope of the appended claims. It is intended that the present invention is to be taken as an illustration of the present system.

What is claimed is:

1. An electrofiltration process for removing hydrogenation catalyst and other undissolved solids from a stream of edible oil which has been subjected to catalytic hydrogenation, and process comprising:
   a. providing the stream of so hydrogenated edible oil at a sufficient temperature that organic solids such as stearine are in solution and cannot plug an electrofilter bed adapted to remove the undissolved solids carried therein;
   b. passing said stream of oil through a chemically inert bed having multitudinous flow channels between rigid masses of a solid material having a dielectric constant not in excess of about 7;
   c. establishing a d.c. electrical field within said bed having an intensity sufficient for removing the undissolved solids from said stream of oil by electrically induced adhesion of the solids in said bed material;
   d. removing the purified oil stream with reduced undissolved solids content from said bed; and
   e. cleaning at selected intervals at least a portion of said material of adhering solids by interruption of said electrical field, passing a cleaning fluid to remove adhering solids from said material and removing the fluid with the removed solids from said material.

2. The electrofiltration process of claim 1 wherein said cleaning of said material and adhering solids is undertaken when the purified stream of hydrogenated edible oil approaches conditions of increased solids content by solids-fillup of said bed.

3. The electrofiltration process of claim 1 wherein immediately prior to cleaning said bed, a dry, inert non-oxidizing gas is passed through said bed with said d.c. electrical field established therein to displace the purified organic liquid from said bed without displacement of the adhering solids.

4. The electrofiltration process of claim 1 wherein said material comprises particles of a mineral containing crystalline silicone dioxide, said mineral having a hardness value of at least 7 on the Mohs scale of hardness, a specific gravity being about 2.5 and about 2.9, a dielectric constant of about 4 and a discontinuous surface configuration provided by nature.

5. The electrofiltration process of claim 4 wherein said particles are crushed flint with average particle size of about 2.5 mm.

6. The electrofiltration process of claim 4 wherein the cleaning fluid is the purified hydrogenated edible oil adjusted in temperature until organic solids are in solution and cannot plug said bed.

7. The electrofiltration process of claim 6 wherein immediately after cleaning of said bed material with the purified hydrogenated edible oil, a dry, inert non-oxidizing gas is passed through said bed to displace the purified hydrogenated edible oil serving as the cleaning fluid from said bed prior to establishment of said d.c. electrical field.

8. An electrofiltration process for removing solids from an organic liquid stream comprising:
   a. passing said liquid stream through a bed of chemically inert, hard granular particles of a rigid, substantially incompressible material, said particles being non-spheroidal with a relatively discontinuous surface configuration and a dielectric constant not in excess of about 7;
   b. establishing a d.c. electrical field within said bed having an intensity sufficient for removing the solids from the organic liquid stream by electrically induced adhesion of the solids on said particles;
   c. removing the purified organic liquid stream with reduced solids content from said bed; and
   d. cleaning at selected intervals at least a portion of said particles of adhering solids by interrupting said electrical field, passing a cleaning fluid through the bed to remove adhering solids from said particles and removing the fluid with the removed solids from said particles being cleaned.

9. The electrofiltration process of claim 8 wherein said cleaning of the particles of adhering solids is undertaken when the purified organic liquid stream approaches conditions of increased solids content by solids-fillup of said bed.

10. The electrofiltration process of claim 1 wherein the temperature of said stream of hydrogenated edible oil is adjusted to not less than about 150° F. before passage into said bed.

11. The electrofiltration process of claim 9 wherein said particles are crushed flint with average particle size of about 2.5 mm.

12. The electrofiltration process of claim 1 wherein the purified said hydrogenated edible oil stream from said bed is optically scanned to detect when the purified organic liquid stream degrades to a predetermined optical quality by increased solids content from solids-fillup of said bed and wherein when said predetermined optical quality is detected said electrical field is interrupted, a cleaning fluid passed is through said bed to remove adhering solids from said particles and the cleaning fluid with the removed solids is removed from said bed.

13. A bright and clear hydrogenated edible oil obtained by the process comprising:
   a. hydrogenating an edible oil at elevated pressures and temperature in the presence of a suspended hydrogenation catalyst carrying a catalytic metal in a small concentration on an inert inorganic solid carrier;
   b. passing through an electrofilter the hydrogenated edible oil carrying suspended hydrogenation catalyst at elevated temperature whereat organic solids, such as stearine, remain in solution, the electrofilter having a bed of chemically inert, hard granular particles of a rigid, substantially incompressible material, said particles being non-spheroidal with a relatively discontinuous surface configuration and a dielectric constant not in excess of about 7, said bed subject to a d.c. electrical field of an intensity sufficient for removing substantially completely the suspended hydrogenation catalyst from the hydrogenated edible oil by electrically induced adhesion of the hydrogenation catalyst on said particles; and
   c. removing said hydrogenated edible oil from the electrofilter substantially free of hydrogenation catalyst.

14. The hydrogenated edible oil of claim 13 wherein the electrofilter has particles of a mineral containing crystalline silicon dioxide, said mineral having a hardness value of at least 7, on the Mohs scale of hardness, a specific gravity between about 2.5 and about 2.9, a dielectric constant of about 4 and a discontinuous surface configuration provided by nature.

15. The hydrogenated edible oil of claim 14 wherein the electrofilter has particles of crushed flint with an average particle size of 2.5 mm.

16. The hydrogenated edible oil of claim 13 wherein the bed of the electrofilter is energized with a potential gradient of at least 20 kv per inch spacing in the bed.

17. The hydrogenated edible oil of claim 13 wherein the bed of the electrofilter is energized with a potential gradient of about 40 kv per inch spacing in the bed.

18. The hydrogenated edible oil of claim 13 wherein the hydrogenated edible oil in its entirety from the electrofilter has a 10 filter disc impurity test number.

19. The electrofiltration process of claim 4 wherein said mineral is selected from the group consisting of flint, garnet, granite and fused quartz.

20. The electrofiltration process of claim 1 wherein said material comprises hard granular particles of a rigid, substantially incompressible material, said particles being non-spheroidal and with a relatively discontinuous surface configuration.

21. The electrofiltration process of claim 20 wherein said particles are those of a mineral containing crystalline silicon dioxide, said mineral having a hardness value of at least 7 on the Mohs scale of hardness, a specific gravity between about 2.5 and about 2.9 and a dielectric constant of about 4.

22. The electrofiltration process of claim 21 wherein said mineral is selected from the group consisting of flint, garnet, granite and fused quartz.

23. The electrofiltration process of claim 20 wherein said stream of hydrogenated edible oil is passed through said bed at a superficial rate of about 12 inches per minute during removal of solids from said stream.

24. The electrofiltration process of claim 21 wherein the cleaning fluid is purified said hydrogenated edible oil adjusted in temperature until said organic solids are in solution and cannot plug said bed.

25. The electrofiltration process of claim 24 wherein said purified hydrogenated edible oil providing the cleaning fluid is passed through said bed at a superficial rate of at least 16 inches per minute during removal of the adhering solids from the particles.

26. The electrofiltration process of claim 20 wherein the purified said hydrogenated edible oil stream from said bed is optically scanned to detect when the purified organic liquid stream degrades to a predetermined optical quality by increased solids content from solids-fillup of said bed and wherein when said predetermined optical quality is detected said electrical field is interrupted, a cleaning fluid passed is through said bed to remove adhering solids from said particles and the cleaning fluid with the removed solids is removed from said bed.

27. The electrofiltration process of claim 26 wherein the sequence of steps including the interruption of the electrical field, and the passing and removal of the cleaning fluid is initiated automatically in response to a signal indicating that said predetermined optical quality has been detected.

28. The process of claim 26 wherein, prior to interrupting said electrical field, a dry, inert, non-oxidizing gas is passed through said bed with the d.c. electrical field established to displace the purified said hydrogenated edible oil from said bed without displacement of the adhering solids.

29. The electrofiltration process of claim 12 wherein the sequence of steps including the interruption of the electrical field, and the passing and removal of the cleaning fluid is initiated automatically in response to a signal indicating that said predetermined optical quality has been detected.

30. The electrofiltration process of claim 8 wherein said particles are those of a mineral containing crystalline silicon dioxide, said mineral having a hardness value of at least 7 on the Mohs scale of hardness, a specific gravity between about 2.5 and about 2.9 and a dielectric constant of about 4.

31. The electrofiltration process of claim 30 wherein said mineral is selected from the group consisting of flint, garnet, granite and fused quartz.

32. The electrofiltration process of claim 31 wherein said particles are crushed flint with average particle size of about 2.5 mm.

33. The electrofiltration process of claim 8 wherein said organic liquid stream is passed through said bed at a superficial rate of about 12 inches per minute during removal of solids from said stream.

34. The electrofiltration process of claim 30 wherein the cleaning fluid is the purified organic liquid.

35. The electrofiltration process of claim 34 wherein the organic liquid stream providing the cleaning fluid is passed through said bed at a superficial rate of at least 16 inches per minute during removal of the adhering solids from the particles.

36. The electrofiltration process of claim 8 wherein the purified organic liquid stream from said bed is optically scanned to detect when the purified organic liquid stream degrades to a predetermined optical quality by increased solids content from solids-fillup of said bed and wherein when said predetermined optical quality is detected, said electrical field is interrupted, a cleaning fluid is passed through said bed to remove adhering solids from said particles and the cleaning fluid with the removed solids is removed from said bed.

37. The electrofiltration process of claim 36 wherein the sequence of steps including the interruption of the electrical field and the passing and removal of the cleaning fluid is initiated automatically in response to a signal indicating that said predetermined optical quality has been detected.

38. The process of claim 8 wherein, prior to interrupting said electrical field, a dry, inert, non-oxidizing gas is passed through said bed to displace the purified organic liquid from said bed without displacement of the adhering solids.

39. The hydrogenated edible oil of claim 14 wherein said mineral is selected from the group consisting of flint, garnet, granite and fused quartz.

40. an electrofiltration process for removing hydrogenation catalyst and other undissolved solids from a stream of edible oil which has been subjected to catalytic hydrogenation, said process comprising:
  a. providing the stream of so hydrogenated edible oil at a sufficient temperature that organic solids such as stearine are in solution and cannot plug an electrofilter bed adapted to remove the undissolved solids carried therein;
  b. passing said stream of oil through a chemically inert bed having multitudinous flow channels between rigid masses of a solid material having a dielectric constant not in excess of about 7;
  c. establishing a d.c. electrical field within said bed having an intensity sufficient for removing the undissolved solids from said stream of oil by electrically induced adhesion of the solids in said bed material; and
  d. removing the purified oil stream with reduced undissolved solids content from said bed.

* * * * *

UNITED STATES PATENT AND TRADEMARK OFFICE
CERTIFICATE OF CORRECTION

PATENT NO. : 4,040,926
DATED : August 9, 1977
INVENTOR(S) : Serafin Bess Oberton It is certified that error appears in the above-identified patent and that said Letters Patent are hereby corrected as shown below:

In the Abstract, line 7 of the text, change "selectively" to

--- selective ---

Col. 1, line 7, change "related" to

--- relates ---

Col. 3, line 7, change "to" to

--- and ---

Col. 7, line 15, after "in", insert

--- the ---

Col. 7, line 30, change "coloidal" to

--- colloidal ---

Col. 7, line 62, change "nephalometer" to

--- nephelometer ---

Col. 8, line 37, change "abraided" to

--- abraded ---

Col. 9, line 44, change "perimetry" to

--- perimeter ---

UNITED STATES PATENT AND TRADEMARK OFFICE
CERTIFICATE OF CORRECTION

PATENT NO. : 4,040,926

DATED : August 9, 1977

INVENTOR(S) : Serafin Bess Oberton

It is certified that error appears in the above-identified patent and that said Letters Patent are hereby corrected as shown below:

Col. 12, line 11, change "Flintabrise" to --- Flintbrasive ---

Col. 15, line 13, change "and" to --- said ---

Col. 15, line 50, change "silicone" to --- silicon ---

Signed and Sealed this

Twenty-eighth Day of March 1978

[SEAL]

Attest:

RUTH C. MASON
Attesting Officer

LUTRELLE F. PARKER
Acting Commissioner of Patents and Trademarks